United States Patent Office 3,127,424
Patented Mar. 31, 1964

3,127,424
4-CHLORO-3-OXO-Δ⁴-STEROIDS OF THE ANDROSTANE AND PREGNANE SERIES AND PROCESS THEREFOR
Winifred June Adams, David Neville Kirk, and Vladimir Petrow, London, England, assignors to The British Drug Houses Limited, London, England, a British company
No Drawing. Filed Apr. 25, 1956, Ser. No. 580,448
Claims priority, application Great Britain Apr. 27, 1955
8 Claims. (Cl. 260—397.3)

The invention is for improvements in or relating to organic compounds and has particular reference to the preparation of new 4-chloro-3-oxo-Δ⁴-steroids of the androstane and pregnane series.

It is an object of the present invention to provide new 4-chloro-3-oxo-Δ⁴-steroids of the androstane and pregnane series which are of value on account of their biological properties or as intermediates in the preparation of compounds with useful biological properties.

Previous work has demonstrated that bromination of 3-oxo-Δ⁴-steroids leads initially to allylic bromination with formation of such products as 6-bromo- and 2:6-dibromo-3-oxo-Δ⁴-steroids.

In striking contrast to these observations we find that chlorination of 3-oxo-Δ⁴-steroids (Formula II below) under the experimental conditions herein described leads to the formation of 4ξ:5ξ-dichlorides (Formula III below), generally as major products of the chlorination. Furthermore, we find that the dichlorides (Formula III below) readily lose the elements of hydrogen chloride to give the corresponding 4-chloro-3-oxo-Δ⁴-steroids (Formula I below).

The present invention provides new 4-chloro-3-oxo-Δ⁴-steroids of the androstane and pregnane series having the general formula

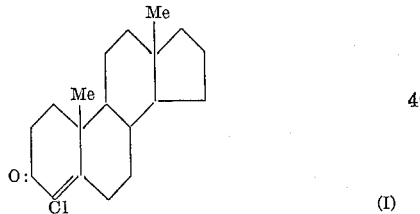

(I)

The present invention also provides a method for the preparation of 4-chloro-3-oxo-Δ⁴-steroids of the androstane and pregnane series, which method comprises chlorinating a 3-oxo-Δ⁴-steroid of the androstane and pregnane series having the general formula

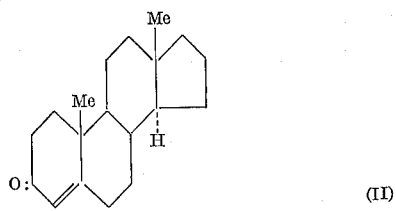

(II)

and treating the resulting 4ξ:5ξ-dichloride having the general formula

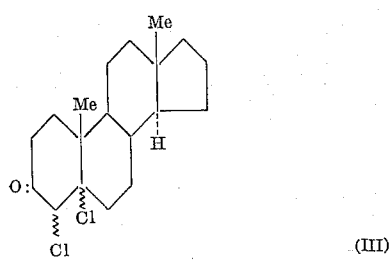

(III)

to remove the elements of hydrogen chloride therefrom.

The chlorination of 3-oxo-Δ⁴-steroids (II) to give the 4ξ:5ξ-dichlorides (III) may be effected by treating the 3-oxo-Δ⁴-steroid dissolved in an organic solvent with approximately one molar equivalent of chlorine (preferably also dissolved in an organic solvent) at a temperature not in excess of 40° C.

The temperature is preferably between −35° C. and +5° C.

The addition of chlorine is preferably carried out in the absence of light.

Organic solvents unaffected by chlorine are preferred such, for example, as dioxan, ether, carbon tetrachloride or the lower aliphatic acids.

Conversion of compound (III) into e.g. the 4-chloro-androst-4-en-3-one (I) is readily effected by treating the dichloride (III) with a reagent which removes hydrogen chloride and in particular with a basic reagent. Tertiary bases such as collidine, lutidine, and pyridine are very suitable for this purpose, but the conversion of compound (III) to compound (I) proceeds with such facility that many alternative basic reagents will be apparent to those skilled in the art. Thus for example, conversion of compound (III) to compound (I) may be effected by percolating a solution of compound (III) in an organic solvent such for example as benzene through a column of chromatographic alumina.

The process of the invention may be applied to a variety of 3-oxo-Δ⁴-derivatives of the cyclopentenophenanthrene series. In particular, the process of the invention may be applied to steroid hormones containing the 3-oxo-Δ⁴-system to give the 4-chloro-analogues of the aforesaid hormones, which new compounds will, in general, possess biological properties.

The process of the invention may be applied to a variety of derivatives of 3-oxo-androst-4-ene. Thus the process of the invention may be applied, for example, to androst-4-ene-3:17-dione (IV),

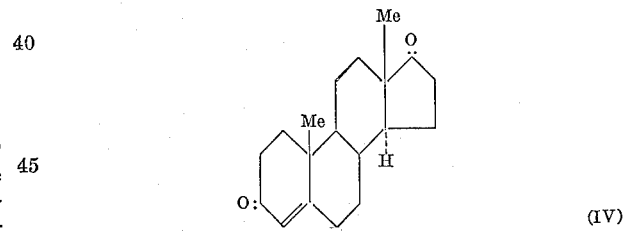

(IV)

or methyltestosterone (V; R=H; R'=Me) or its esters (V; R=acyl; R'=Me)

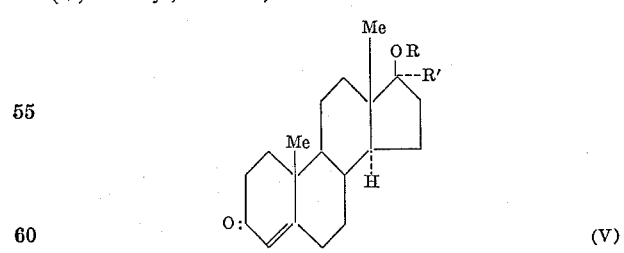

(V)

or testosterone and its esters (V) where R=hydrogen or an acyl group and R'=H. In particular, the process of the invention may be applied to esters of testosterone derived from acids, containing not more than 12 carbon atoms, such as the propionate, trimethyl acetate, valerianate, heptylate, undecylenate, cyclopentylpropionate, cyclohexylpropionate, phenylacetate, phenylbutyrate and hexahydrobenzoate; or such compounds as 17-chloro- androst-4-en-3-one.

The process of the invention may be applied to a variety of derivatives of 3-oxopregn-4-ene. Thus the process of the invention may be applied, for example, to pregn-4-ene-3:20-dione (progesterone) (VI)

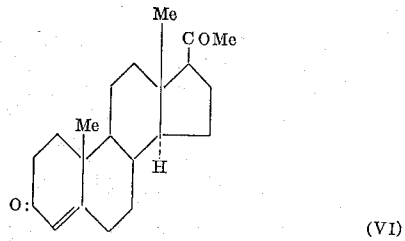

(VI)

or to pregn-4-ene-3:20-diones containing an oxo- or hydroxyl (acyloxy) group at $C_{11}$, for example 11α-hydroxy-progesterone (VII)

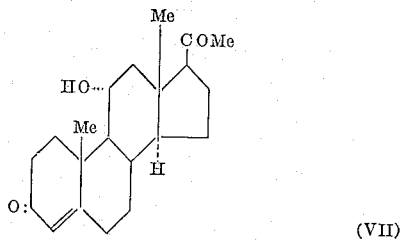

(VII)

or to pregn-4-ene-3:2-diones containing a hydroxyl (acyloxy) group at $C_{17}$ and/or $C_{21}$, or to pregn-4-ene-3:20-diones containing hydroxyl (acyloxy) groups at $C_{17}$ and $C_{21}$ and an oxygen function (oxo; hydroxy or acyloxy) at $C_{11}$, for example cortisone acetate (VIII)

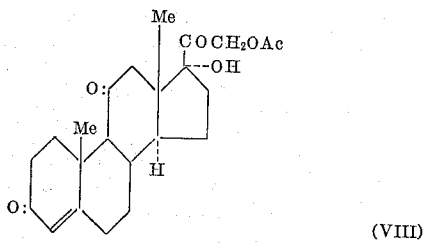

(VIII)

Following is a description by way of example of methods of carrying the invention into effect.

*Example I*

4ξ:5ξ-dichloro - 17β - propionoxyandrostan-3-one (IX; where R=COEt and $R^1$=H).

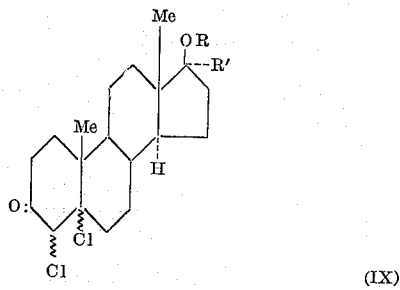

(IX)

Testosterone propionate (10 g.) in absolute ether (500 ml.) at <−40° C. was treated with chlorine in propionic acid (25.7 mls. of 1.237 M solution; 1.10 moles) and the mixture stored for 16 hours in a freezing mixture at −30° (ice-NaCl—CaCl₂) in darkness. The solution was then poured into water and the mixture extracted thoroughly with ether. The ethereal extract was washed successively with water, dilute sodium bicarbonate solution, and water until neutral. It was then dried over anhydrous sodium sulphate and finally concentrated to small bulk in vacuo. Dilution with methanol (5 vols.) led to the separation of fine needles, M.P. 139 to 140° C., which on two crystallisations from ether/methanol (1:5) furnished 4ξ:5ξ-dichloro-17β-propionoxyandrostan-3-one, M.P. 143 to 144° C. $[\alpha]_D^{24°}$ −22.2° (c, 0.4 in chloroform).

4-chlorotestosterone propionate

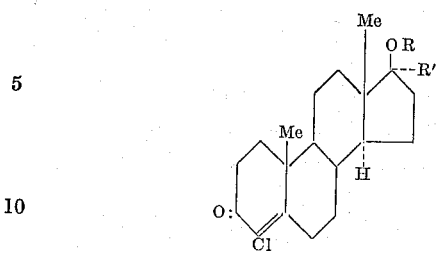

(X)

(where R=COEt, and $R^1$=H). The foregoing compound (40 mg.) in pyridine (5 ml.) was warmed for 30 minutes on the steam bath, after which the solution was poured into water and the product isolated with ether. Crystallisation from methanol furnished 4-chlorotestosterone propionate, needles M.P. 158° C., $[\alpha]_D^{20°}$+114° (c, 0.4 in chloroform) $\lambda_{max}$ 254 mμ (4.12) (in isopropanol).

*Example II*

4ξ:5ξ-dichloro-17β-propionoxyandrostan-3-one (Compound IX, where R=COEt and $R^1$=H) (200 mg.; prep. as described in Example I) in benzene (5 ml.) was percolated through a column of alumina (B.D.H.; 5 g.) and the column eluted with benzene (200 ml.). Evaporation of the benzene eluates and crystallisation of the residual solids from methanol, gave 4-chlorotestosterone propionate (Compound X, where R=COEt and $R^1$=H), M.P. 158° C. not depressed on admixture with a sample prepared as in Example I.

*Example III*

4ξ:5ξ-dichloro-17β-hydroxyandrostan-3-one (IX, where R=$R^1$=H). A solution of testosterone (1 g.) in ether (75 ml.) and propionic acid (10 ml.) was treated at 0° C. with stirring with a solution of chlorine in propionic acid (4.2 ml. of 0.91 M) added over a period of 15 minutes. Stirring was continued for a further 15 minutes when absorption of chlorine was complete. The product isolated as in Example I, was crystallised from aqueous methanol and then twice from aqueous acetone to give 4ξ:5ξ-dichloro-17β-hydroxyandrostan-3-one, glistening plates, M.P. 179 to 180° C., $[\alpha]_D^{23°}$ −8° (c, 0.36 in chloroform).

4-chlorotestosterone (X, where R=$R^1$=H). The foregoing compound was dehydrochlorinated with pyridine as described in Example I and the product crystallised twice from aqueous acetone to give 4-chloro-17β-hydroxyandrost-4-en-3-one, fluffy crystals, M.P. 181 to 183° C., $[\alpha]_D^{22°}$+120° (c, 0.36 in chloroform) $\lambda_{max}$ 255 mμ (4.15) (in iso-propanol).

*Example IV*

4ξ:5ξ - dichloro - 17β-hydroxy-17α-methylandrostan-3-one (IX, where R=H, and $R^1$=Me). A stirred solution of methyl testosterone (1 g.) in ether (50 ml.) and propionic acid (10 ml.) was treated at 0° C. with a solution of chlorine in propionic acid (7.3 ml. of 0.91 M). The solution was stirred at 0° C. for 2½ hr. then left without stirring at room temperature overnight by which time there was no free chlorine (starch iodide paper). The solution was diluted with ether, and the ethereal layer washed with water, aqueous sodium bicarbonate and water, dried and evaporated. After several crystallizations from methanol 4ξ:5ξ-dichloro-17β-hydroxy-17α-methylandrostan-3-one was obtained in felty needles, M.P. 167° C. $[\alpha]_D^{27°}$−26° (c, 0.409 in chloroform).

4-chloro-methyltestosterone (X, where R=H, and $R^1$=Me). The foregoing compound (400 mg.) in pyridine (10 ml.) was heated for 30 minutes on the steam bath. The cooled solution was diluted with ether, and washed with dilute hydrochloric acid, aqueous sodium bicarbonate and water, dried, and evaporated. From the residue by chromatography on alumina (15 g.) 4-chloro-17β - hydroxy-17α-methylandrost-4-en-3-one (4-chloro-methyltestosterone) was obtained in flat needles M.P.

145° C. [α]$_D^{24°}$+99° (c, 0.387 in chloroform) λ$_{max}$ 255–6 mµ (4.14) (in iso-propanol).

*Example V*

4ξ:5ξ-dichloro-androstane-3:17-dione. Androst-4-ene-3:17-dione (IV) (1 g.) in propionic acid (5 ml.) and anhydrous ether (75 ml.) was treated at 0 to 5° C. with chlorine in propionic acid (5 ml. of 0.85 M). After 1 hour, the product was isolated as described in Example I and crystallised twice from methylene chloride/methanol (1:10). 4ξ:5ξ - dichloro-androstane - 3:17 - dione formed lustrous plates, M.P. 187 to 188° C., [α]$_D^{25°}$+40° (c, 0.63 in chloroform).

4-chloro-androst-4-ene - 3:17 - dione. The foregoing compound (200 mg.) in pyridine (1 ml.) was warmed on the steam bath for 30 minutes. The product isolated as described in Example I, was crystallized from methanol to give 4-chloro-androst-4-ene-3:17-dione, M.P. 180 to 182° C. [α]$_D^{25°}$+206° (c, 0.33 in chloroform) λ$_{max}$ 254–5 mµ (4.19) (in iso-propanol).

*Example VI*

21 - acetoxy - 4ξ:5ξ - dichloro-17α-hydroxypregnane-3:11:20-trione. Cortisone acetate (760 mg.) in dioxan (50 ml.) and ether (100 ml.) at —10° C. was treated with chlorine in propionic acid (2.3 ml. of 0.98 M solution; 1.2 moles) and stored in the dark at 0° C. for 20 hrs. The crystalline dichloride which had separated was removed by filtration. A further quantity was obtained from the filtrate by washing it with water, sodium bicarbonate and then water until neutral and evaporating to small bulk. Recrystallisation from acetone/ether (1:2) gave 21-acetoxy-4ξ:5ξ-dichloro-17α-hydroxypregnane- 3:11:20-trione, M.P. 235 to 236° C. (decomp.) [α]$_D^{24°}$+57° (c. 0.211 in dioxan).

4-chlorocortisone acetate. The foregoing dichloride (250 mg.) in pyridine (10 ml.) was allowed to stand overnight, when the mixture was diluted with water and the precipitated solids collected. A further quantity of material was obtained from the aqueous liquors by extraction with ether. Crystallisation of the total product from acetone/hexane (1:3) gave 4-chlorocortisone acetate, plates, M.P. 232 to 234° (decomp.), λ$_{max}^{ethanol}$ 253 mµ (4.11), [α]$_D^{24°}$+214° (c, 0.202 in dioxan)

*Example VII*

4ξ:5ξ-dichloro-11α-hydroxypregnane-3:20-dione. 11α-hydroxyprogesterone (1 g.) in dioxan (20 ml.) and ether (50 ml.) at —10° C. was treated with chlorine in propionic acid (3.7 ml. of 0.92 M solution; 1.1 mole) and kept in the dark at 0° C. for 2 hrs. The product, isolated by extraction with ether, was purified by crystallisation from aqueous methanol and finally from acetone/hexane (1:4). 4ξ:5ξ - dichloro-11α-hydroxypregnane-3:20-dione formed micro-needles, M.P. 174 to 175° C. [α]$_D^{24°}$+25° (c, 0.459 in chloroform).

4 - chloro-11α-hydroxyprogesterone. The foregoing compound (250 mg.) in benzene (15 ml.) and pyridine (1 ml.) was kept at room temperature for 5 hrs., after which the product was isolated with ether. Crystallisation from acetone/hexane (1:4) gave 4-chloro-11α-hydroxyprogesterone, needles, M.P. 181 to 183° C., λ$_{max}^{ethanol}$ 256 (4.12), [α]$_D^{24°}$+163° (c, 0.637 in chloroform)

*Example VIII*

4ξ:5ξ - dichloropregnane-3:20-dione. Progesterone (1 g.) in ether (50 ml.) at —35° C. was treated with chlorine in propionic acid (3.2 ml. of 1.10 M. solution, 1.1 mols) and the mixture stored at —30° C. in darkness for 16 hrs. The separated dichloride was collected by filtration. A further quantity was obtained from the filtrate by precipitation with water and extraction with ether. The combined materials were purified from methylene chloride/methanol (1:10) to give 4ξ:5ξ-dichloropregnane- 3:20-dione, fine needles, M.P. 172 to 174° C. [α]$_D^{25°}$+46° (c, 0.354 in chloroform).

4-chloroprogestrone. The foregoing compound (250 mg.) in benzene (3 ml.) and pyridine (0.5 ml.) was kept at room temperature for 4 hrs. The product was isolated with ether and purified from methanol.

4-chloroprogesterone formed clusters of rods, M.P. 218 to 220.5° C. [α]$_D^{25°}$+198° (c, 0.569 in chloroform), λ$_{max}^{isopropanol}$ 255 mµ (4.125)

*Example IX*

21-acetoxy-4ξ:5ξ-dichloro-pregnane-3.20-dione

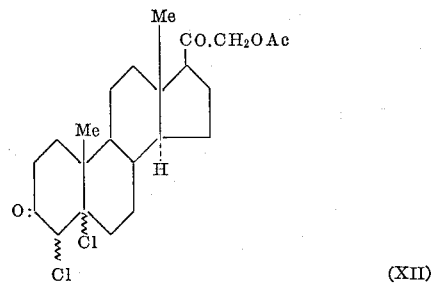

(XII). 21-Acetoxy-pregn-4-ene-3:20-dione (1 g.) in dioxan (10 ml.) and ether (60 ml.) cooled to —20° C. was treated with chlorine in propionic acid (2.3 ml. of 1.265 M solution; 1.1 moles) and the mixture stored for 16 hours in a freezing mixture at —30° C. in darkness.

The product, isolated as in previous examples, was crystallised from methylene chloride/methanol (1:4). 21-acetoxy-4ξ:5ξ-dichloro-pregnane-3:20 - dione formed flat needles, M.P. 185 to 186° C., [α]$_D^{24°}$+55° C. (c, 0.717 in chloroform).

21-acetoxy-4-chloropregn-4-ene-3:20-dione

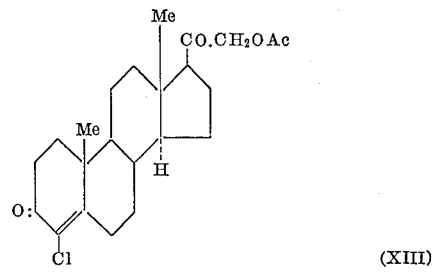

(XIII). 21 - acetoxy-4ξ:5ξ-dichloro-pregnane-3:20-dione (200 mg.) in benzene (3 ml.) and pyridine (0.5 ml.) was allowed to stand at room temperature overnight. The product, isolated by means of ether as in previous examples, was crystallised from methylene chloride/methanol (1.10). 21-acetoxy-4-chloro-pregn-4-ene-3:20-dione formed fine needles, M.P. 183 to 184° C., λ$_{max}^{ethanol}$ 255 mµ (4.13), [α]$_D^{24°}$+191° (c, 0.662 in chloroform)

We claim:
1. 4-chloro-androst-4-ene-3:17-dione.
2. 4-chloro-11α-hydroxyprogesterone.
3. A method for the preparation of 4-chloro-3-oxo-Δ⁴-steroids of the androstane and pregnane series, which method comprises chlorinating a 3-oxo-Δ⁴-steroid of the androstane and pregnane series having the general formula

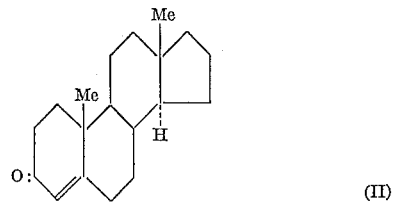

and treating the resulting 4ξ:5ξ-dichloride having the general formula

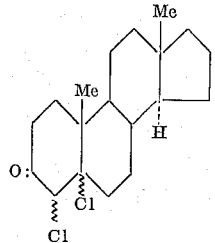

(III)

to remove the elements of hydrogen chloride therefrom.

4. A method as claimed in claim 3 wherein the chlorination of the 3-oxo-$\Delta^4$-steroid to give the 4ξ:5ξ-dichloride is effected by treating the 3-oxo-$\Delta^4$-steroid dissolved in an organic solvent with approximately one molar equivalent of chlorine at a temperature below 40° C.

5. A method as claimed in claim 4 wherein the chlorine is also dissolved in an organic solvent and the temperature is between —35° C. and +5° C.

6. A method as claimed in claim 3 wherein the chlorination is carried out in the absence of light.

7. A method as claimed in claim 3 wherein said chlorination of the 3-oxo-$\Delta^4$-steroid to give the 4ξ:5ξ-dichloride is effected by treating the 3-oxo-$\Delta^4$-steroid dissolved in an organic solvent selected from the group consisting of dioxan, ether and carbon tetrachloride with approximately one molar equivalent of chlorine at a temperature between —35° C. and +5° C.

8. A method as claimed in claim 3 wherein the 4ξ:5ξ-dichloride is treated with a basic reagent selected from the group consisting of collidine, lutidine and pyridine.

References Cited in the file of this patent
UNITED STATES PATENTS
2,933,510   Julian et al. _____ Apr. 19, 1960

FOREIGN PATENTS
Fieser & Fieser: Natural Products Related to Phenanthrene 3rd ed., 1949, p. 425.